(12) United States Patent
Pullithadathil et al.

(10) Patent No.: US 11,884,578 B2
(45) Date of Patent: Jan. 30, 2024

(54) METHOD FOR PREPARING EFFICIENT AND SCALABLE SELF-CLEANING COATING

(71) Applicants: ONGC Energy Centre Trust, Delhi (IN); PSG Institute of Advanced Studies, Tamil Nadu (IN)

(72) Inventors: Biji Pullithadathil, Tamil Nadu (IN); Ravi Kottan Renganayagalu, Tamil Nadu (IN); Shalini Halan Joghee, Tamil Nadu (IN); Kamini Velusamy, Tamil Nadu (IN); Selvamani Selvaraj, Tamil Nadu (IN); Kamachi Mudali, Mumbai (IN); Nimmi Singh, Delhi (IN); Bharat Bhargava, Delhi (IN); Deepak Kumar, Delhi (IN)

(73) Assignees: ONGC Energy Centre Trust; PSG Institute of Advanced Studies

( * ) Notice: Subject to any disclaimer, the term of this patent is extended or adjusted under 35 U.S.C. 154(b) by 0 days.

(21) Appl. No.: 17/617,117

(22) PCT Filed: Sep. 10, 2020

(86) PCT No.: PCT/IN2020/050786
§ 371 (c)(1),
(2) Date: Dec. 7, 2021

(87) PCT Pub. No.: WO2021/053688
PCT Pub. Date: Mar. 25, 2021

(65) Prior Publication Data
US 2022/0234946 A1 Jul. 28, 2022

(30) Foreign Application Priority Data
Sep. 20, 2019 (IN) ............... 2019 11038090

(51) Int. Cl.
C03C 17/25 (2006.01)
C03C 17/42 (2006.01)
C03C 23/00 (2006.01)

(52) U.S. Cl.
CPC .............. *C03C 17/25* (2013.01); *C03C 17/42* (2013.01); *C03C 23/002* (2013.01); *C03C 23/0075* (2013.01); *C03C 2217/214* (2013.01); *C03C 2217/425* (2013.01); *C03C 2217/732* (2013.01); *C03C 2217/76* (2013.01); *C03C 2217/77* (2013.01); *C03C 2217/78* (2013.01); *C03C 2218/112* (2013.01); *C03C 2218/113* (2013.01); *C03C 2218/116* (2013.01); *C03C 2218/31* (2013.01); *C03C 2218/32* (2013.01)

(58) Field of Classification Search
CPC ............................................... C03C 2218/113
See application file for complete search history.

(56) References Cited

U.S. PATENT DOCUMENTS

| | | | |
|---|---|---|---|
| 6,600,263 B1* | 7/2003 | Ito | H01J 29/028 313/292 |
| 8,344,238 B2 | 1/2013 | Gronet et al. | |
| 9,073,782 B2 | 7/2015 | Shmueli et al. | |
| 2002/0142150 A1 | 10/2002 | Baumann et al. | |
| 2018/0170799 A1 | 6/2018 | Hillebrandt Poulsen et al. | |
| 2019/0049629 A1* | 2/2019 | Perkins | C04B 35/10 |

FOREIGN PATENT DOCUMENTS

| | | |
|---|---|---|
| CA | 2532454 C | 3/2012 |
| CN | 105002656 B | 6/2018 |
| DE | 10063739 B4 | 4/2009 |
| EP | 2653453 A1 | 10/2013 |
| JP | 2012219249 A | 11/2012 |
| WO | 2015080030 A1 | 6/2015 |

OTHER PUBLICATIONS

S. Sutha, Sisira Suresh, Baldev Raj, K.R. Ravi, Transparent alumina based superhydrophobic self-cleaning coatings for solar cell cover glass applications, Solar Energy Materials and Solar Cells, vol. 165, (Year: 2017).*
Amaguchi, N., Tadanaga, K., Matsuda, A et al. Anti-Reflective Coatings of Flowerlike Alumina on Various Glass Substrates by the Sol-Gel Process with the Hot Water Treatment. J Sol-Gel Sci Technol 33, 117-120 (Year: 2005).*
International Search Report for Application No. PCT/IN2020/050786 dated Dec. 18, 2020, pp. 1-4.
Sutha, S. et al., "Transparent alumina based superhydrophobic self-cleaning coatings for solar cell cover glass applications", Solar Energy Materials and Solar Cells, Feb. 2017, pp. 128-137, vol. 165, Elsevier. XP029956504.
Yamaguchi, N. et al., "Anti-Reflective Coatings of Flowerlike Alumina on Various Glass Substrates by the Sol-Gel Process with the Hot Water Treatment", Journal of Sol-Gel Science and Technology, Jan. 2005, pp. 117-120, Springer Science Business Media, Inc. XP019212936.
Tadanaga, T et al., "Formation Process of Super-Water-Repellent Al2O3 Coating films with High Transparency by the Sol-Gel Method", "Journal of the American Ceramic Society", 1997, pp. 3213-3216, vol. 80, No. 12.

* cited by examiner

*Primary Examiner* — Alex A Rolland
(74) *Attorney, Agent, or Firm* — Lerner David LLP

(57) ABSTRACT

A method for preparation of a self-cleaning coating solution is provided. The method comprises mixing an aluminium compound with a solution of an ethanol compound to form a solution. Further, the formed solution is subjected to a first magnetic stirring. After the first magnetic stirring a first transparent solution is formed. Further, a stabilizing agent is added to the first transparent solution of the aluminium compound and the ethanol compound. Subsequent to adding the stabilizing agent a translucent solution is formed. Finally, the formed translucent solution is subjected to a second magnetic stirring for forming a homogeneous second transparent solution. The formed second transparent solution is a coating solution.

15 Claims, No Drawings

METHOD FOR PREPARING EFFICIENT AND SCALABLE SELF-CLEANING COATING

CROSS-REFERENCE TO RELATED APPLICATIONS

This application is a national phase entry under 35 U.S.C. § 371 of International Application No. PCT/IN2020/050786 filed Sep. 10, 2020, which claims the priority from Indian Patent Application No. 201911038090 filed on Sep. 20, 2019, the disclosures of which are incorporated by reference herein.

FIELD OF THE INVENTION

The present invention relates, generally, to the field of coatings and membranes. More particularly, the present invention relates to a method for preparation of efficient and scalable self-cleaning coating for application on glass substrates or glass surfaces.

BACKGROUND OF THE INVENTION

Efforts for protection of glass surfaces, which are frequently exposed to external environmental conditions, have recently gained a lot of popularity. The glass surfaces generally utilized in external or outdoor environment may include, but are not limited to, solar cell glass panels, windshields and windows of vehicles, windows of buildings, optical devices, sunglasses, eyeglasses, optical lenses etc. The external environmental conditions that may have damaging effects on the glass surfaces may include, but are not limited to, pollution, dust particles, moisture, contaminants, aerosols, soot, smog, rain, heat, geological mineral particulates, organic particles, pollens etc. Prolonged exposure of glass surfaces to harsh environmental condition may lead to corrosive wear, mechanical wear, deposition of dust particles, moisture, soot particles, contaminants etc. which have damaging effects on the glass surfaces, thereby decreasing the glass surface's efficiency, utility and usability.

Further, in order to maintain the efficiency, utility and usability of such glass surfaces regular and timely cleaning is necessitated. For example, solar panels installed in external environment, if over the time gets deposited with dust particles, soot, dirt etc. may lead to significant reduction in the optical transparency of solar panels which as a consequence leads to considerable reduction in its efficiency as depositions on solar panels hinders the incident light photons. Therefore, regular and timely cleaning may aid in maintaining the efficiency of the solar panels. However, regular and timely cleaning of solar panels on a large scale is a tedious and a time consuming process and is not always feasible. Further, cleaning on a large scale requires large quantities of water and labour, which leads to unnecessary water wastage and further damages solar panels due to manual cleaning.

Therefore, various types of coatings comprising different chemical compositions are applied on glass surfaces for increasing their efficiency, utility and usability. However, it has been observed that traditional coatings applied do not function efficiently and effectively and provide inefficient self-cleaning capabilities and low hydrophobicity due to high roll-off angle. Typically, the coatings applied are not chemically and environmentally stable and therefore fails to enhance self-cleaning efficiency of the glass surface. Further, transparent coating may be applied to the solar cell glass panel surface, however such coatings are not able to perform adequately as they get easily deposited with surface contaminants and depositions, which leads to reduction in light transmittance and subsequent decrease in performance of the solar cell and the coating. The traditional transparent coatings, however, may provide adequate water contact angle but usually lacks transmittance. Further, traditional transparent coatings do not effectively exhibit anti-reflecting properties and further lacks transmittance due to their poor compositions. Further, typically the self-cleaning hydrophobic coatings are not easily scalable and are not adaptable to different coating techniques for application to glass surfaces.

In light of the aforementioned drawbacks, there is a need for a method of preparation of efficient self-cleaning coating. There is a need for a self-cleaning coating which is super-hydrophobic, transparent, scalable and anti-reflective. There is a need for a coating, which has ultra-low roll off angle and high water contact angle. There is a need for a coating, which is capable of providing efficiency and increased transmittance to the substrate or glass surface on which it is applied. Further, there is a need for a coating, which is adaptable to various coating techniques. Further, there is a need for a coating, which is chemically and environmentally stable and durable. Furthermore, there is a need for a cost effective method for preparation of self-cleaning coating.

SUMMARY OF THE INVENTION

In various embodiments of the present invention, a method for preparation of a self-cleaning coating solution is provided. The method comprises mixing an aluminium compound with a solution of an ethanol compound to form a solution. Further, the formed solution is subjected to a first magnetic stirring. After the first magnetic stirring a first transparent solution is formed. Further, a stabilizing agent is added to the first transparent solution of the aluminium compound and the ethanol compound. Subsequent to adding the stabilizing agent a translucent solution is formed. Finally, the formed translucent solution is subjected to a second magnetic stirring for forming a homogeneous second transparent solution. The formed second transparent solution is a coating solution.

DETAILED DESCRIPTION OF THE INVENTION

The present invention discloses a method for preparation of efficient self-cleaning coating for a substrate or glass surfaces which are utilized in external environmental conditions. The invention provides a method for preparation of a coating which is super-hydrophobic and transparent. Super-hydrophobicity and transparency are two competitive properties, as for super-hydrophobicity high roughness of the coating is required and high roughness may cause significant light scattering thereby reducing transparency. Therefore, super-hydrophobicity and transparency for the coating has been successfully attained by reducing roughness of the coating surface, which is less than the wavelength of visible light, and by maintaining a high air-to-solid interface ratio which subsequently reduces light scattering. The present invention discloses a method of preparing a coating which provides ultra-low roll-off angle and high water contact angle. The invention provides a method for preparing a coating which has high transmittance with controlled porous structure with optimal roughness. Further, the invention provides a coating with anti-reflective properties for increasing light capturing capability and efficiency of the glass surfaces. Further, the invention provides a method for preparing a coating which is efficiently scalable and adaptable to different types of coating techniques. Furthermore, the present invention provides a method for preparation of a coating which is environmentally stable and durable.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

In various embodiments of the present invention, a metal oxide based self-cleaning coating is prepared utilizing a sol-gel method. The self-cleaning coating is a metal oxide based precursor solution prepared utilizing the sol-gel method. In an exemplary embodiment of the present invention, preferably the metal oxide utilized includes, but is not limited to, aluminium oxide [alumina ($Al_2O_3$)]. The self-cleaning coating is an alumina sol prepared using the sol-gel process.

In an embodiment of the present invention, the alumina sol comprises a composition of an aluminium compound and an ethanol compound. In a preferred embodiment of the present invention, the aluminium compound includes, but is not limited to, aluminium nitrate. The ethanol compound includes, but is not limited to, 2-methoxyethanol in desired quantities. In an exemplary embodiment of the present invention, 0.5M of aluminium nitrate is mixed with 10 ml solution of 2-methoxyethanol to form a solution by a first magnetic stirring preferably for 30 minutes. Further, at the time of first magnetic stirring hydrolysis reaction of aluminium nitrate occurs and subsequently a first transparent solution comprising aluminium hydroxide is formed. The preferred concentrations of the precursors (aluminium nitrate and 2-methoxyethanol) aids in achieving the desired super-hydrophobic and a scalable coating. In an embodiment of the present invention, a stabilizing agent such as, but is not limited to, mono-ethanolamine is added to the solution of aluminium nitrate and 2-methoxyethanol and subsequently a translucent solution is formed. The addition of mono-ethanolamine aids in decreasing the rate of hydrolysis of aluminium nitrate and stabilizes the formed aluminium hydroxide by forming an aluminium chelate complex. A second magnetic stirring is thereafter carried out for the formed translucent solution for up to further 30 minutes at room temperature until a stable homogeneous second transparent solution comprising aluminium oxide (alumina) sol is formed. The total stirring of 1 hour (first magnetic stirring time period+second magnetic stirring time period) aids in homogenizing the solution and controlling the reaction kinetics in the presence of stabilizing agent (mono-ethanolamine). In an exemplary embodiment of the present invention, the preparation of 10 mL of alumina sol is carried out by adding 1.87 g of aluminium nitrate (0.5M) to 10 mL of 2-methoxyethanol to form a solution and subsequently subjecting the formed solution to the first magnetic stirring for 30 minutes. After 30 minutes of stirring a transparent solution comprising aluminium hydroxide and other constituents is formed. Thereafter, 302 μL of mono-ethanolamine (stabilizing agent) is added to the formed solution and a translucent solution is formed. The translucent solution formed is subjected to second magnetic stirring for another 30 minutes to form a homogeneous transparent alumina sol. Further, stabilization provided by the mono-ethanolamine controls the reaction kinetics and aids in formation of mono-dispersed alumina nanoparticles, thereby further aiding in forming thin film coatings. Advantageously, the 0.5M concentration of aluminium nitrate aids in achieving the suitable viscosity (rheology parameter) of 33 cP (shear rate=1 $s^{-1}$). Further, the 0.5M concentration of aluminium nitrate aids in forming a thin film transparent coating of the alumina sol due to the presence of optimal density of hydrolyzed $Al^{3+}$ cations (0.5M) in the formed sol which is subsequently utilized for coating. The formed alumina sol utilizing the desired concentrations of the constituents, on application to the glass surface imparts properties such as, but are not limited to, self-cleaning ability, super-hydrophobicity, anti-reflective properties, high transmittance etc. to the glass surface.

In an embodiment of the present invention, the formed sol is applied, deposited or dispensed on a glass surface or a substrate surface utilizing different coating techniques. The different coating techniques utilized may include, but are not limited to, spray coating, bar coating, spin coating, dip coating etc. Further, a particular type of coating technique is applied at a particular instance for coating the glass surface or a substrate's surface. The low viscosity (33 cP) of the formed sol aids in achieving a uniform coating on the substrate surface, when the substrate's surface is coated utilizing different coating techniques. In an exemplary embodiment of the present invention, prior to application of coating to the glass surface or substrate surface, the glass surface or substrates are ultrasonically cleaned with acetone and distilled water for removing organic impurities present in the substrate surface and subsequently subjected to ultraviolet (UV)-ozone treatment preferably for 30 minutes. The UV-ozone treatment aids in increasing hydrophilicity of the substrate surface, which further aids in improving the adhesion properties and homogeneity of the coating when applied to the substrate surface. Advantageously, the cleaning process applied for the substrate surface saves space, cost, energy and time.

In an exemplary embodiment of the present invention, application or deposition of the aluminium oxide (alumina) sol coating is carried out utilizing spin coating technique. The aluminium oxide sol is dispensed on to the glass surface or substrate surface for coating on to the glass surface or substrate surface. The volume of the dispensing solution is varied preferably in the range of 100 μL to 1000 μL depending upon the size of the substrate. The sol dispensed on to the glass surface or substrate is rotated preferably at a speed in the range of 500 to 2000 rpm or 100-5000 rpm under inert atmosphere conditions for coating the glass substrate or surface with the aluminium oxide sol. Subsequently, after coating, the substrate is heat treated preferably at a temperature of 100° C. to 400° C. or above for evaporating and removing excess and residual solvent and improve adhesion of the coating. The spin coating technique provides coatings on glass surfaces or substrates of sizes ranging from 1 cm×1 cm to 10 cm×10 cm area.

In another exemplary embodiment of the present invention, application or deposition of the aluminium oxide sol coating is carried out utilizing spray coating technique. The spray coating technique utilized may include, but is not limited to, ultrasonic spray coating. Further, spray coating parameters such as, but is not limited to, air pressure, spray distance, flow rate etc. are vital in order to obtain the desired transparency, super-hydrophobicity etc. of the coating. In application, the prepared aluminium oxide sol is sprayed over the glass substrate or surface with a droplet size ranging from 10 μL to 1000 μL. The flow rate of the sprayed aluminium oxide sol is in the range of 1 mL/minute to 5 mL/minute. The air pressure is maintained in the range of 1 bar to 2 bar in order to control the droplet size, volume of the sol dispensed and the spray pattern. Further, the distance maintained between the spray nozzle and substrate is in the range of 20 cm to 40 cm. Furthermore, flow rate and the distance between the spray nozzle and the substrate maintained produces a uniform coating with optimum thickness utilizing minimum quantities of the sol. Further, the ultrasonic spray coating technique utilized aids in scaling the coating up to large area. Subsequent to coating, the substrate is heat treated at a temperature of 100° C. to 200° C. or above for evaporating and removing excess and residual solvent and improve adhesion of the coating.

In yet another embodiment of the present invention, application or deposition of the aluminium oxide sol coating is carried out utilizing bar coating technique. In the bar coating technique, the thickness of the coating is significantly dependent on parameters such as, but is not limited to, the concentration of the sol utilized for coating, bar speed utilized for coating, wire diameter of the bar. In application, the prepared aluminium oxide sol is dispensed on the substrate. The dispensed sol has a concentration of 0.1M to 1M and a volume ranging from 1 mL to 100 mL. Further, a bar rod is utilized such that it doesn't affect the thickness of the coating. The diameter of the wound wires in the bar is less than 300 μm. Further, a stainless steel bar rod with groves is rolled over the substrate for coating at a coating rate ranging from 0.5 cm/sec to 8 cm/sec or 100 cm/min to 150 cm/min. Subsequent to coating, the substrate is heat treated at a temperature of 100° C. to 200° C. or above for evaporating and removing excess and residual solvent and improve adhesion of the coating. The bar coating technique provides coatings on glass surfaces or substrates larger than 10 cm×10 cm area.

In an embodiment of the present invention, after coating of the aluminum oxide sol utilizing the one or more coating techniques, illustrated above, a single layer of thin film coating is formed. The thickness of the thin coating film is in the range of 50 nm to 300 nm which is measured utilizing a Field Emission Scanning Electron Microscope (FESEM) imaging technique. Further, the thin coating aids in achieving the desired super-hydrophobicity and increased transparency (4% increase). Furthermore, the thin single layer coating aids in providing large area scalable super-hydrophobic coating with graded porosity which is determined based on a cross section scanning electron microscope (SEM) analysis.

In an embodiment of the present invention, subsequent to coating, the glass substrate is immersed in hot water for providing roughness and porosity to the coating. The temperature of hot water utilized for processing of alumina thin film for creating roughness and porosity is in the range of 50° C. to 100° C. preferably at 90° C. for 30 minutes. The porosity and surface roughness is created based on a dissolution and re-precipitation kinetics mechanism. The surface roughness achieved is, therefore, high at the preferred temperature and time of hot water immersion, as the density of the alumina coating having a nano-flake like structure is also high. The porosity of the coating, achieved based on the hot water temperature, is a multilevel hierarchical porosity. Thin coating aids in creating multilevel hierarchical porosity with open porous structure, which as a consequence provides air pockets in the open porous structure thereby imparting super-hydrophobicity to the coating by lifting-off the water droplets from the coating. Further, as the reaction kinetics is slow, the hot water immersion time (30 minutes) aids in achieving a desired geometrical micro-structure of the coating. Further, the air-to-solid interface ratio between porous alumina coating and air is controlled between the range of >80% to >99% by optimizing hot water immersion temperature, which is at 90° C., for providing the desired high roughness and porosity. The average surface roughness of the coating is in the range of 10 nm to 200 nm and porosity achieved is >80%. Further, the hot water immersion temperature utilized aids in achieving desired thickness of the coating, scalable coating, super-hydrophobic coating with graded porosity, superior wettability, coating with high transmittance, lower refractive index and uniformity. Advantageously, further increase in the temperature for hot water immersion does not affect the desired roughness of the coating as the dissolution and re-precipitation kinetics has attained the supersaturated condition at the desired hot water immersion temperature (90° C.)

In an embodiment of the present invention, after the formation of roughness and porosity on the coating, the coated substrate is modified with low surface energy materials for increasing the non-wettability of the surface and providing desired and required properties. The low surface energy materials may include, but is not limited to, fluoroalkylsilane (FAS), silane monomers, alkylsilane, alkoxysilane, fluorosilane, organosilane, polydimethylsiloxane (PDMS), ploymethylmethacrylate (PMMA) etc. In a preferred embodiment of the present invention, the alumina coating formed on the glass substrate or surface is chemically modified with fluoroalkylsilane (FAS) to impart low surface energy and enhance non-wettability property of the coating by providing a monolayer of low surface energy materials on the formed coating. Further, in an exemplary embodiment of the present invention, in order to form self-assembled layer of monomers over the coating surface, the coated substrates are immersed in the FAS solution preferably for 1 minute and subsequently annealed at a temperature in the range of between 200° C. to 400° C. preferably for a time period of 30 minutes. Further, after annealing, the constituents present in the aluminum oxide coating are converted into amorphous alumina and pseudo-bohemite (AlOOH). Further, annealing aids in effectively achieving low energy surface.

Experiments were performed to determine and measure various parameters related to the coating prepared and applied on the glass substrate or surface in accordance with various embodiments of the present invention. The various exemplary experiments performed are described herein below.

Wettability Measurement

Water droplets of 10 μL volume were dispensed onto the super-hydrophobic alumina coated surface utilizing a Hamilton micro syringe for analyzing the wettability properties of the coatings hydrated at different temperatures in the range of 40° C. to 90° C. The thin film was hydrated preferably at 90° C. for 30 minutes for further measuring water contact angle and water roll-off angle. The water contact angle (WCA) of the coating was measured and found to be ≥175° thereby exhibiting excellent super-hydrophobic behavior. The temperature of 90° C. aids in increasing the air-fraction up to 99% and consequently providing ultra-high water contact angle of ≥175°. The experimental results suggested that the reaction temperature played an important role in tuning the morphology of the alumina film resulting in heterogeneous precipitation. Further, water roll-off angle (ROA) was measured by inclining the coated surface to an angle and the angle at which the droplet begins to move was noted. Therefore, the super-hydrophobic coating exhibited an ultra-low roll-off angle which is <1°. The coating is therefore a high quality super-hydrophobic coating. Further, the measured WCA and ROA are the mean values of measurements on the 10 μL water droplet at different positions on different coating samples. The measurements were carried out utilizing video based contact angle measurement unit.

Self-Cleaning Effect

The self-cleaning effect of the super-hydrophobic coating surface was determined utilizing different contaminant particles such as, but are not limited to, carbon dust particles, silica sand, saw dust or the like with size ranging from few microns to a few hundred microns. Further, contaminant particles were spread or scattered on the alumina coated surface and water droplets were sprayed on the surface and subsequently the water droplets adsorbed sand and dust particles and the dust particles rolled with the droplets when the substrate or surface was tilted because of ultra-high water contact angle and ultra-low roll of angle. Therefore, the alumina coating exhibited a superior self-cleaning property. The super-hydrophobic alumina surface further exhibited the static water contact angle of 175° before and after the self-cleaning experiment.

Transmittance Measurements and Anti-Reflection

Transmittance measurements were performed utilizing an ultraviolet-visible (UV-VIS) spectrophotometer. All transmittance data is reported for a one-sided coating as % of the transmittance in the visible spectrum (300-800 nm). The transmittance of the coating was highly influenced by the surface morphology. The single layer coating had a high air fraction of 99% and porosity >80% achieved by hot water immersion of the coated substrate as illustrated above, light rays refracted through the media with a gradient refractive index which results in maximum transmittance of the incident light and improves the transmittance up to 4% as compared to the bare substrate. The single layer coating exhibited ≥93% transmittance of the visible spectrum (300-800 nm). The refractive index (n) of the coating was further calculated. In general, the refractive index (n) of the coating should be between the refractive index of air (n=1) to the refractive index of the substrate (n=1.5) to reduce the surface reflections. Ellipsometric analysis was carried out and the refractive index (n) of the alumina coating was found to be 1.05 and this value was very close to the refractive index of the air, thereby depicting transmittance of 93% which was higher than the transmittance depicted by bare glass substrate which is around 90%. The coating further exhibited anti-reflection behavior with improved transmittance up to 4% in the visible region.

Transparency of the Coating and Solar Cell Efficiency

In order to evaluate the feasibility of optically transparent super-hydrophobic self-cleaning coating, a glass substrate coated with the alumina sol coating was utilized as cover glass for solar panels. The coated glass was placed above the solar cell and its photovoltaic properties were measured. The cell efficiency of the bare solar cell was measured and was found to be around 10.6%, whereas the cell efficiency of the solar cell when covered with the coated glass substrate was found to be 10.8%. Therefore, coating aids in enhancing the solar cell efficiency up to 2%. This enhancement is achieved due to anti-reflection property of the coating. Therefore, due to very high porosity (80%) of the alumina film, the light scattered was negligible and the film was found to be highly transparent in visible spectrum (300-800 nm).

Further, the solar cell efficiency was determined after the self-cleaning experiment. On the solar cell panel covered with the alumina coated glass and solar cell panel not covered with the alumina coated glass saw dust particles were spread or scattered. The solar cell efficiency of the coated glass was thereafter measured and compared with the solar cell covered with uncoated glass panel. The efficiency of solar cell covered with uncoated glass was first measured, which was around 10.6%. Thereafter, efficiency of the solar cell covered with uncoated glass with saw dust was measured, which was around 7.1%. Further, efficiency of the solar cell covered with uncoated glass after self-cleaning was measured, which was around 7.6%. Therefore, efficiency of solar cell covered with uncoated glass was found to decrease from 10.6% to 7.6% after self-cleaning. Further, the efficiency of solar cell covered with coated glass was first measured, which was around 10.8%. Thereafter, efficiency of the solar cell covered with coated glass with saw dust was measured, which was around 7.3%. Further, efficiency of the solar cell covered with coated glass after self-cleaning was measured, which was around 10.8%. Therefore, this depicted that the solar cell covered with coated glass regains and maintains its efficiency even after self-cleaning the saw dust accumulation.

Environmental Stability

The alumina sol coated substrate was examined for environmental stability by placing the sample in accelerated weathering chamber for 100 days according to the standard ISO 1134-1 under extreme environmental conditions. The coating exhibited excellent stability and resistance towards UV irradiation, heat and humidity by retaining its super-hydrophobicity with water contact angle of ≥175°. Therefore, the coated surface exhibited excellent environmental stability with high water-repellence property and consistent water contact angle retention after the test.

Chemical Stability

Contact angle measurements were carried out utilizing different acid and alkali solutions with pH ranging from 2-14 to determine chemical stability of the coatings. It was determined that at different pH, the coating exhibited contact angle greater than 165°, retaining its super-hydrophobicity. Therefore, coating exhibited excellent chemical stability with high water-repellence.

Scalability

Scalability was measured by applying the fabricated coating of glass substrates of varied sizes ranging from 2 cm×2 cm to 30 cm×18 cm. The alumina coating was further up scaled by using spray and bar coating techniques with dimensions in the range of up to 1 m×1 m to 2 m×2 m or more.

Advantageously, in accordance with various embodiments of the present invention, an efficient and effective thin alumina based self-cleaning coating is provided. The self-cleaning coating is super-hydrophobic depicting water repellency surprisingly with ultra-low roll-off angle and high water contact angle. The method of the present invention unexpectedly achieves transparency and super-hydrophobicity simultaneously, as transparency and super-hydrophobicity are competitive properties. In order to achieve transparency and super-hydrophobicity simultaneously, a high air-to-solid interface ratio is maintained and the surface roughness is controlled to be less than 100 nm. Further, the method of present invention provides a coating which when applied to the solar cell glass panel and other optoelectronic devices aids in improving the efficiency of the solar cells and optoelectronic devices without affecting the transparency, as it has optimum roughness and thickness and further aids the solar cell in regaining its efficiency after self-cleaning. The coating prepared or fabricated shows excellent durability to harsh environmental conditions and therefore aids in increasing the life of the substrate on which it is applied. The coating prepared is anti-reflective with increased transmittance. Further, the alumina coating depicts excellent durability and stability towards chemicals of different pH. The coating is effectively scalable and can be applied to surfaces or substrates of large dimensions. Furthermore, the prepared coating is adaptable to different coating techniques such as, but is not limited to, spray coating, bar coating, spin coating, dip coating etc. Furthermore, the coating prepared is cost effective and may be applied to different kind of glass surfaces and substrates.

While the exemplary embodiments of the present invention are described and illustrated herein, it will be appreciated that they are merely illustrative. It will be understood by those skilled in the art that various modifications in form and detail may be made therein without departing from the scope of the invention.

The invention claimed is:

1. A sol-gel method for preparation of a self-cleaning coating solution, the method comprising the steps of:
   mixing an aluminium compound with a solution of an ethanol compound to form a solution;
   subjecting the formed solution to a first magnetic stirring, wherein after the first magnetic stirring a first transparent solution is formed;
   adding 302 μL of stabilizing agent to the first transparent solution of the aluminium compound and the ethanol compound, wherein the stabilizing agent comprises mono-ethanolamine that decreases a rate of hydrolysis of the aluminium compound, wherein subsequent to adding the stabilizing agent a translucent solution is formed, and wherein the stabilizing agent controls reaction kinetics and forms mono-dispersed alumina nanoparticles for providing a thin film coating; and
   subjecting the formed translucent solution to a second magnetic stirring for forming a homogeneous second transparent solution, wherein the second transparent solution formed is a coating solution.

2. The method as claimed in claim 1, wherein the step of mixing the aluminium compound with the solution of the ethanol compound comprises mixing a 0.5M of the aluminium compound with a 10 mL solution of the ethanol compound.

3. The method as claimed in claim 1, wherein the aluminium compound comprises aluminium nitrate.

4. The method as claimed in claim 1, wherein the ethanol compound comprises 2-methoxyethanol.

5. The method as claimed in claim 1, wherein time period of the first magnetic stirring and the second magnetic stirring is 30 minutes respectively.

6. The method as claimed in claim 1, wherein the first transparent solution is an aluminium hydroxide solution, and wherein the second transparent solution is an aluminium oxide sol.

7. The method as claimed in claim 1, wherein the viscosity of the coating solution is 33 cP, and wherein the 33 cP viscosity of the coating solution aids in achieving a uniform coating on a substrate surface.

8. The method as claimed in claim 1, wherein a single layer of coating solution is applied on the glass substrate surface, and wherein thickness of the single layer of coating is in the range of between 50 nm and 300 nm.

9. The method as claimed in claim 1, wherein the coating solution is applied on a glass substrate surface based on one or more coating techniques, and wherein the one or more coating techniques comprises at least spray coating technique, a bar coating technique, a spin coating technique and a dip coating technique.

10. The method as claimed in claim 9, wherein prior to the coating on the glass substrate surface, the glass substrate surface is ultrasonically cleaned with acetone and distilled water for removing organic impurities present in the glass substrate surface and subsequently subjected to ultraviolet (UV)-ozone treatment for increasing hydrophilicity of the substrate surface.

11. The method as claimed in claim 9, wherein subsequent to coating, the coated substrate is immersed in hot water at a temperature in the range of between 50° C. to 100° C. for 30 minutes for providing roughness and multilevel hierarchical porosity to the coating, and wherein average surface roughness of the coating is in a range from 10 nm to 200 nm and a porosity of >80%.

12. The method as claimed in claim 11, wherein subsequent to hot water immersion treatment of the coated glass substrate surface, the coated glass substrate is modified with a low surface energy material for increasing the non-wettability of the coated surface by providing a monolayer of low surface energy materials on the formed coating, and wherein the low surface energy materials comprises fluoroalkylsilane (FAS), silane monomers, alkylsilane, alkoxysilane, fluorosilane, organosilane, polydimethylsiloxane (PDMS) and ploymethylmethacrylate (PMMA) and wherein the coated glass substrate surface is immersed in a low surface energy material solution for 1 minute and subsequently annealed at a temperature in the range from 200° C. to 400° C. for 30 minutes.

13. The method as claimed in claim 12, wherein the coated glass substrate modified with low surface energy materials results in high water contact angle of >175° and ultra-low roll-off angle of <1°, and wherein transparency and super hydrophobicity of the coating is simultaneously achieved by maintaining a high air-to-solid ratio and by controlling surface roughness to less than 200 nm.

14. The method as claimed in claim 12, wherein the transmittance associated with the coating is ≥93% and refractive index (n) associated with the coating is 1.05.

15. The method as claimed in claim 1, wherein the coating solution is scalable in the range of between 1-m×1-m and 2-m×2-m.

* * * * *